CATALYST FOR THE PRODUCTION OF ACROLEIN AND ACRYLIC ACID

Isao Ono, Tetsuo Iiguni, and Mitsumasa Akashi, Shin Nanyo, Japan, assignors to Rohm and Haas Company, Philadelphia, Pa.
No Drawing. Filed Jan. 6, 1972, Ser. No. 215,906
Int. Cl. B01j *11/06*
U.S. Cl. 252—464  7 Claims

ABSTRACT OF THE DISCLOSURE

A process for producing acrolein which comprises catalytic oxidizing propylene in the vapor phase with oxygen and steam in the presence of novel catalyst, having superior nature in activity, and composed of oxides of Mo, Co, Fe, Bi, and Sn with or without one or more of Al, Ni, W, Cr, In, and Nb, is disclosed.

BACKGROUND OF THE INVENTION

(1) Field of the invention

The present invention relates to a process for producing acrolein which comprises catalytic oxidation of propylene in the vapor phase with a gas containing oxygen and steam, in the presence of an oxidizing catalyst which comprises molybdenum, cobalt, iron, bismuth, and tin or, besides tin, by adding one or more elements selected from a group consisting of aluminum, nickel, tungsten, chromium, indium and niobium.

(2) Description of the prior art

Similar catalysts are cited in Japanese patent publication No. 6,245/69; Mo-Co/Ni-Fe-Bi and Mo-Co/Ni-Fe-Bi-P. The inventors, after detailed investigation, have found that a catalyst produced by adding tin and, optionally, one or more elements selected from a group consisting of aluminum, nickel, tungsten, chromium, indium and niobium gives a much improved catalyst. For example, in comparison with the catalyst cited in Japanese patent publication No. 6,245/69, the space time yield of acrolein is increased by more than 100 percent under the same conditions of reaction. This is illustrated by comparison in the examples.

DESCRIPTION OF THE INVENTION

In accordance with the present invention, by employing a catalyst comprising oxides of the metallic elements of molybdenum, cobalt, iron, bismuth, and tin and, optionally, one or more elements selected from the group consisting of aluminum, nickel, tungsten, chromium, indium and niobium, propylene can be advantageously oxidized in the vapor phase with steam and air, or other gas containing oxygen, under ambient or elevated pressures, at a reaction temperature of 250 to 450° C.

The characteristics of the catalyst of the present invention are, for example:

(1) sufficient activity at relatively low temperatures,
(2) the space time yield is relatively high,
(3) selectivity for acrolein is high,
(4) since the catalyst has little activity in the oxidation of acrolein, even for high conversion of propylene, high selectivity for acrolein can be maintained.

The composition of the catalyst expressed by general formula in atomic numbers are as follows:

$$Mo_aCo_bFe_cBi_dA_eO_f$$

wherein $a$ is equal to 12, and the values of $b$, $c$, $d$, $e$, and $f$ are, respectively, $b=7-12$, $c=0.3-4$, $d=0.4-2.5$, $e=0.1-3$, and $f=47-73$. A is composed of tin alone or a composite system of tin with the addition of one or more elements selected from the group consisting of aluminum, nickel, tungsten, chromium, indium and niobium. The minimum amount of tin in atomic amount is 0.1. In employing the catalyst in accordance with this invention, it can be employed as is, or may be used with a carrier or support like diatomaceous earth or alumina.

In producing the catalyst, various methods of preparation can be utilized. It is desirable that each of the essential elements is used in the form of their respective salts. These ingredients, after they are mixed in the atomic ratio of the elements above mentioned, are heated in aqueous solution or suspension with stirring to ensure complete reaction, and with or without a carrier or diluent, and after drying, are calcined at 450 to 550° C. for several hours, for example, 6 hours. The calcined materials thus produced can be employed in the condition as is, or it can be used after pressure molding to strengthen the catalyst.

In the method of using the catalyst, it is desirable that the temperature of reaction be maintained at 250 to 450° C., more preferably at 280 to 370° C. Though apparent contact time of the reactants varies according to the reaction temperature and composition of the feed gas, a range of 0.5 to 15 seconds is suitable. The composition of the feed gas varies over a wide range, with amounts in the ranges of 1 to 15 mol percent of propylene, 20 to 90 mol percent of air, and 5 to 50 mol percent of steam being preferred.

Reactors of either fixed bed or moving bed type can be used, but in each case, it is necessary to select catalyst carriers, forms of catalyst and method of preparation of the catalyst suitable to the reactor used.

By using catalyst systems in accordance with the present invention, acrolein can be produced selectively by oxidation of propylene very efficiently, at relatively low temperatures, with a gas mixture comprising oxygen and steam.

Conversion of propylene and selectivity for acrolein and acrylic acid are defined as follows:

Conversion (percent) for propylene $$=\frac{\text{Mols of propylene converted}}{\text{Mols of fed propylene}} \times 100$$

Selectivity (percent) for acrolein $$=\frac{\text{Mols of acrolein obtained}}{\text{Mols of propylene converted}} \times 100$$

Selectivity (percent) for acrylic acid $$=\frac{\text{Mols of acrylic acid obtained}}{\text{Mols of propylene converted}} \times 100$$

In the following, the present invention will be illustrated by examples and by examples of prior art catalysts for comparison.

EXAMPLE 1

62.72 g. of ammonium molybdate [$(NH_4)_6Mo_7O_{24} \cdot 4H_2O$] and 2.32 g. of ammonium tungstate [$(NH_4)_{10}W_{12}O_{41} \cdot H_2O$] are dissolved in 300 ml. of water with the addition of 3.71 g. of stannic chloride [$SnCl_4 \cdot 3H_2O$]. This mixture is referred to as Solution A.

86.14 g. of cobalt nitrate [$Co(NO_3)_2 \cdot 6H_2O$], 3.14 g. of indium nitrate [$In(NO_3)_3 \cdot 3H_2O$], and 11.94 g. of ferric nitrate [$Fe(NO_3)_3 \cdot 9H_2O$] are dissolved in 40 ml. of water and to this solution, 14.37 g. of bismuth nitrate [$Mi(NO_3)_3 \cdot 5H_2O$] dissolved in dilute nitric acid consisting of 1.41 ml. concentrated nitric acid and 10.6 ml. of water, is added. This mixture is referred to as Solution B.

After Solution B is added to Solution A with agitation and allowed to react, 10 g. of diatomaceous earth as a carrier is added, and the mixture is concentrated with agitation and heating. The damp mixture is molded to form particles or pellets of cylindrical shape, 5 mm. x 5 mm. in size, by means of perforated plates. After drying at 130° C. for 20 hours, the particles are calcined at 520° C. for 6 hours.

Approximate composition of the catalyst thus obtained is as follows: 90 wt. percent of $Mo_{12}Co_{10}Fe_1Bi_1Sn_{0.4}In_{0.3}$-$W_{0.3}O_{56}$ and 10 wt. percent of diatomaceaus earth as a carrier.

25 ml. of the amove mentioned catalyst is packed in a U-shaped stainless steel reactor of 20 mm. inner diameter in a niter bath. A gaseous mixture consisting of 5 percent of propylene, 60 percent of air and 35 percent of steam, all by volume, is supplied at the rate of 635 ml./min., fed at ambient or normal temperature and pressure (NTP) and caused to react at a reaction temperature of 350° C. Conversion of propylene is 90.8 percent, selectivity for acrolein is 81.5 percent, and selectivity for acrylic acid is 9.4 percent. In addition, small quantities of acetic acid, carbon dioxide and carbon monoxide are obtained as by-products. The space time yield of acrolein is 2.51 mol/1 hour.

EXAMPLE 2

64.04 g. of ammonium molybdate and 2.36 g. of ammonium tungstate are dissolved in 300 ml. of water, and to this solution 2.86 g. of stannic chloride is added and dissolved therein. This mixture is referred to as Solution A.

To a solution prepared by dissolving 87.93 g. of cobalt nitrate, 3.22 g. of indium nitrate, and 4.86 g. of ferric nitrate dissolved in 40 ml. of water, a solution in which 14.66 g. of bismuth nitrate is dissolved in a dilute nitric acid solution consisting of 1.40 ml. of concentrated nitric acid and 10.5 ml. of water, is added. This mixture is referred to as Solution B.

After Solution B is added to Solution A with agitation and allowed to react, 10 g. of diatomaceous earth as a carrier is added and concentrated in agitation and heating. Pellets are formed as in Example 1. The approximate composition of the catalyst thus obtained is as follows: 90 wt. percent $Mo_{12}Co_{10}Fe_{0.4}Bi_1Sn_{0.3}W_{0.3}O_{55}$ and 10 wt. percent of diatomaceous earth as a carrier.

47.5 ml. of the catalyst is packed in the reactor as in Example 1, heated in a niter bath, and a gas mixture consisting of 5 percent of propylene, 60 percent of air, and 35 percent of steam, by volume, is supplied at a rate of 635 ml./min. (NTP) and reacted at a temperature of 350° C. Conversion of propylene is 88.9 percent, selectivity for acrolein is 83.2 percent, and selectivity for acrylic acid is 8.0 percent. In addition, small quantities of acetic acid, carbon dioxide, and carbon monoxide are produced as by-products. The space time yield of acrolein is 1.32 mol/1 hour.

EXAMPLES 3–6

Catalysts of the compositions shown in Table I are prepared in accordance with the method of Example 1, and they are packed in the reactor of Example 1. While being heated in a niter bath, a gas mixture consisting of 5 percent of propylene, 60 percent of air, and 35 percent of steam, by volume, are supplied at the rate of 635 ml./min. (NTP), the quantity of catalyst being such as to achieve conversion of propylene at about 90 percent. The results are shown in Table II. The temperature is maintained at about 350° C.

TABLE I

| Example number | Composition of catalyst |
| --- | --- |
| 3 | $Mo_{12}Co_{10}Fe_1Bi_1Sn_{0.04}In_{0.03}W_{0.03}O_{54}$, 90 weight percent plus diatomaceous earth 10 weight percent. |
| 4 | $Mo_{12}Co_{10}Fe_1Bi_1Sn_{0.3}In_{0.2}O_{55}$, 90 weight percent plus diatomaceous earth 10 weight percent. |
| 5 | $Mo_{12}Co_{10}Fe_1Bi_1Sn_{0.5}W_{0.5}O_{56.5}$, 90 weight percent plus diatomaceous weight percent. |
| 6 | $Mo_{12}Co_{10}Fe_1Bi_1Sn_1In_1W_1O_{60.5}$, 90 weight percent plus diatomaceous earth 10 weight percent. |

TABLE II.—REACTION RESULTS

| Example number | Quantity of packed catalyst (ml.) | Reaction temperature (° C.) | Percent Propylene conversion | Acrolein selectivity | Acrylic acid selectivity | Acrolein, space time, yield (mol/l. hr.) |
| --- | --- | --- | --- | --- | --- | --- |
| 3 | 33.8 | 350 | 89.0 | 82.4 | 10.2 | 1.84 |
| 4 | 36.2 | 350 | 87.5 | 75.6 | 9.4 | 1.55 |
| 5 | 30 | 350 | 90.1 | 81.3 | 10.5 | 2.07 |
| 6 | 45 | 350 | 88.3 | 78.7 | 9.1 | 1.31 |

EXAMPLE 7

Catalysts shown in Table III are produced in accordance with the method of producing the catalyst in Example 1, the catalysts are packed in the reactor cited in Example 1, heated in a niter bath, and a gas mixture consisting of 5 percent of propylene, 60 percent of air, and 35 percent of steam is supplied, the quantity of catalyst and the flow of gas mixture being adjusted to achieve conversion of propylene at about 90 percent. The results are shown in Table IV. These catalysts are considerably lower in activity compared with those of the present invention, and give a low space time yield of acrolein. The gas mixture is fed at about 635 ml./min. and the reaction temperature was at about 350° C.

TABLE III

| Comparison example number | Composition of catalyst |
| --- | --- |
| 1 | $Mo_{12}Co_{10}Fe_1Bi_1O_{54}$, 90 weight percent plus diatomaceous earth 10 weight percent. |
| 2 | $Mo_{12}Co_{10}Fe_{0.4}Bi_1O_{53}$, 90 weight percent plus diatomaceous earth 10 weight percent. |
| 3 | $Mo_{12}Co_4Ni_{4.5}Fe_1Bi_1P_{0.08}O_{51.9}$, 90 weight percent plus diatomaceous earth 10 weight percent. |

TABLE IV.—REACTION RESULTS

| Comparison Example number | Quantity of packed catalyst (ml.) | Reaction temperature (° C.) | Flow of mixed gas (ml./min.) (NTP) | Percent Propylene conversion | Acrolein selectivity | Acrylic selectivity acid | Acrolein, space, time, yield (mol/l-hr.) |
| --- | --- | --- | --- | --- | --- | --- | --- |
| 1 | 50 | 350 | 635 | 88.7 | 79.1 | 7.5 | 1.19 |
| 2 | 47.5 | 350 | 226 | 89.2 | 77.5 | 8.9 | 0.44 |
| 3 | 50 | 350 | 580 | 87.6 | 76.8 | 9.5 | 1.0 |

EXAMPLES 8–18

After preparing catalysts of the compositions shown in Table V using the same method as Example 1, they are packed in the reactor of Example 1, heated in a niter bath, and a gas mixture consisting of 5 percent of propylene, 60 percent of air, and 35 percent of steam is supplied at a rate of 635 ml./min. (NTP). The reaction temperature was at about 350° C. The results are shown in Table VI.

TABLE V

| Example number | Composition of catalyst |
|---|---|
| 8 | $Mo_{12}Co_{10}Fe_1Bi_1Sn_1O_{58}$, 90 weight percent plus diatomaceous earth 10 weight percent. |
| 9 | $Mo_{12}Co_{10}Fe_2Bi_2Sn_{0.2}O_{57.4}$, 90 weight percent plus diatomaceous earth 10 weight percent. |
| 10 | $Mo_{12}Co_8Fe_2Bi_1Sn_{0.4}Al_{0.3}Ni_{0.2}O_{54}$, 90 weight percent plus diatomaceous earth 10 weight percent. |
| 11 | $Mo_{12}Co_{11}Fe_2Bi_1Sn_{0.5}Al_{0.5}O_{58.7}$, 90 weight percent plus diatomaceous earth 10 weight percent. |
| 12 | $Mo_{12}Co_{11}Fe_2Bi_{0.5}Sn_{0.4}Al_{0.3}Cr_{0.3}O_{58.9}$, 90 weight percent plus diatomaceous earth 19 weight percent. |
| 13 | $Mo_{12}Co_{10}Fe_2Bi_1Sn_{0.4}Al_{0.4}W_{0.3}O_{57.3}$, 90 weight percent plus diatomaceous earth 10 weight percent. |
| 14 | $Mo_{12}Co_7Fe_3Bi_1Sn_{0.5}Ni_{0.4}O_{54}$, 90 weight percent plus diatomaceous earth 10 weight percent. |
| 15 | $Mo_{12}Co_{10}Fe_1Bi_{2.5}Sn_{0.4}In_{0.3}Ni_{0.3}O_{57.9}$, 90 weight percent plus diatomaceous earth 10 weight percent. |
| 16 | $Mo_{12}Co_{10}Fe_1Bi_1Sn_{0.5}Nb_{0.3}Ni_{0.2}O_{56}$, 90 weight percent plus diatomaceous earth 10 weight percent. |
| 17 | $Mo_{12}Co_{10}Fe_1Bi_1Sn_{0.4}Nb_{0.3}W_{0.4}O_{56.7}$, 90 weight percent plus diatomaceous earth 10 weight percent. |
| 18 | $Mo_{12}Co_{10}Fe_2Bi_1Sn_{0.3}Al_{0.3}Nb_{0.3}In_{0.2}O_{57.6}$, 90 weight percent plus diatomaceous earth 10 weight percent. |

TABLE VI.—REACTION RESULTS

| Example number | Quantity packed catalyst (ml.) | Reaction temperature (° C.) | Percent Propylene conversion | Percent Acrolein selectivity | Percent Acrylic acid selectivity | Acrolein, space, time, yield (mol/l-hr.) |
|---|---|---|---|---|---|---|
| 8 | 33 | 350 | 90.3 | 80.4 | 8.1 | 1.86 |
| 9 | 43 | 350 | 89.5 | 78.8 | 7.8 | 1.39 |
| 10 | 30 | 350 | 90.8 | 78.9 | 9.7 | 2.03 |
| 11 | 37.5 | 350 | 89.4 | 79.2 | 8.5 | 1.60 |
| 12 | 35 | 350 | 87.1 | 76.5 | 7.4 | 1.61 |
| 13 | 34 | 350 | 87.9 | 81.2 | 9.2 | 1.80 |
| 14 | 40 | 350 | 86.4 | 78.3 | 7.5 | 1.44 |
| 15 | 33 | 350 | 89.4 | 77.6 | 9.3 | 1.80 |
| 16 | 31 | 350 | 86.6 | 80.4 | 8.6 | 1.89 |
| 17 | 30 | 350 | 90.4 | 79.5 | 7.9 | 2.03 |
| 18 | 31 | 350 | 90.2 | 79.9 | 9.4 | 1.96 |

What is claimed is:

1. A calcined catalyst of the general composition of $Mo_aCo_bFe_cBi_dA_eO_f$, wherein $a$, $b$, $c$, $d$, $e$, and $f$ in the above formula are respectively the atomic amounts of each element, wherein $a$ is equal to 12 and the values of $b$, $c$, $d$, $e$, and $f$ have the respective ranges, $b=7-12$, $c=0.3-4$, $d=0.4-2.5$, $e=0.1-3$, $f=47-73$, and A is composed of tin alone or a composite system of tin and one or more elements selected from a group consisting of aluminum, nickel, tungsten, chromium, indium and niobium, the minimum content of tin in A being in the atomic amount of 0.1.

2. The catalyst of claim 1 in which A is composed of tin and aluminum.

3. The catalyst of claim 1 in which A is composed of tin and nickel.

4. The catalyst of claim 1 in which A is composed of tin and tungsten.

5. The catalyst of claim 1 in which A is composed of tin and chromium.

6. The catalyst of claim 1 in which A is composed of tin and indium.

7. The catalyst of claim 1 in which A is composed of tin and niobium.

References Cited

UNITED STATES PATENTS

| | | | |
|---|---|---|---|
| 3,089,909 | 5/1963 | Barclay et al. | 252—469 X |
| 3,595,809 | 7/1971 | Kehl | 252—462 |

DANIEL E. WYMAN, Primary Examiner

W. J. SHINE, Assistant Examiner

U.S. Cl. X.R.

252—465, 466 J, 469, 470; 260—604 R

UNITED STATES PATENT OFFICE
CERTIFICATE OF CORRECTION

Patent No. 3,786,000          Dated January 6, 1972

Inventor(s) Isao Ono, Tetsuo Iiguni, Mitsumasa Akashi

It is certified that error appears in the above-identified patent and that said Letters Patent are hereby corrected as shown below:

Column 2, line 59 - in formula "$O_{41} \cdot H_2O]$" should be --$O_{41} \cdot 5H_2O]$--.

Column 2, line 66 - in formula "$[Mi(NO_3)_3$" should be --$Bi(NO_3)_3$--.

Column 4, Table IV in heading "Acrylic Selectivity Acid" should be --Acrylic Acid Selectivity--.

Column 4, Table IV "3-----------1.0" should be --3-----------1.05--.

Column 5, line 10 "19 weight percdnt" should be --10 weight percent--.

Signed and sealed this 3rd day of September 1974.

(SEAL)
Attest:

McCOY M. GIBSON, JR.
Attesting Officer

C. MARSHALL DANN
Commissioner of Patents